(12) United States Patent
Seils et al.

(10) Patent No.: US 10,207,531 B2
(45) Date of Patent: Feb. 19, 2019

(54) SECURITY DEVICE

(71) Applicant: SECTAGO Gmbh, Saarbrucken (DE)

(72) Inventors: Frank Seils, Kleines Wiesental (DE); Markus Koch, Pirmasens (DE); Peter Rogin, Saarbrucken (DE)

(73) Assignee: SECTAG GmbH, Saarbrucken (DE)

(*) Notice: Subject to any disclaimer, the term of this patent is extended or adjusted under 35 U.S.C. 154(b) by 0 days.

(21) Appl. No.: 15/676,625

(22) Filed: Aug. 14, 2017

(65) Prior Publication Data

US 2017/0341454 A1    Nov. 30, 2017

Related U.S. Application Data

(63) Continuation-in-part of application No. 14/764,709, filed as application No. PCT/EP2014/051039 on Jan.
(Continued)

(51) Int. Cl.
*B42D 25/29* (2014.01)
*B42D 25/328* (2014.01)
(Continued)

(52) U.S. Cl.
CPC ........... *B42D 25/328* (2014.10); *B42D 25/29* (2014.10); *B42D 25/324* (2014.10);
(Continued)

(58) Field of Classification Search
CPC .... B42D 25/328; B42D 25/29; B42D 25/324; B42D 25/355; B42D 25/373;
(Continued)

(56) References Cited

U.S. PATENT DOCUMENTS 4,568,141 A    2/1986 Antes
5,447,335 A *  9/1995 Haslop ................. G03H 1/0011
                                                    283/91
(Continued)

FOREIGN PATENT DOCUMENTS

CN    101484323 A     7/2009
CN    101484831 A1    7/2009
(Continued)

OTHER PUBLICATIONS

JP Appln. No. 2015-556436 Office Action, dated Dec. 18, 2017, 8 pg.
(Continued)

*Primary Examiner* — William R Alexander
(74) *Attorney, Agent, or Firm* — Cuenot, Forsythe & Kim, LLC

(57) ABSTRACT

A security device includes a plurality of diffractive surface elements arranged on a carrier element. A surface covered by the diffractive surface elements on the carrier element can occupy at least a partial region of the carrier element. Each individual diffractive surface element can have a three-dimensional surface structure. A portion of the plurality of the diffractive surface elements can form a first surface element group including the portion of the plurality of diffractive surface elements, and an orientation of the diffractive surface elements in the first surface element group can be matched to each other wherein together they make a single first image point of an associated first symbol to be represented visible to an observer under particular observation conditions.

39 Claims, 8 Drawing Sheets

Related U.S. Application Data 20, 2014, now Pat. No. 9,731,538, application No. 15/676,625, which is a continuation-in-part of application No. 14/443,069, filed as application No. PCT/EP2013/075244 on Dec. 2, 2013, now abandoned, said application No. 15/676,625 is a continuation-in-part of application No. PCT/EP2016/064355, filed on Jun. 22, 2016.

(51) Int. Cl.
| | | |
|---|---|---|
| *B42D 25/373* | (2014.01) | |
| *B42D 25/355* | (2014.01) | |
| *G02B 27/42* | (2006.01) | |
| *G02B 5/18* | (2006.01) | |
| *B42D 25/425* | (2014.01) | |
| *B42D 25/324* | (2014.01) | |
| *B42D 25/23* | (2014.01) | |
| *B42D 25/24* | (2014.01) | |

(52) U.S. Cl.
CPC ......... *B42D 25/355* (2014.10); *B42D 25/373* (2014.10); *B42D 25/425* (2014.10); *G02B 5/188* (2013.01); *G02B 5/1842* (2013.01); *G02B 5/1847* (2013.01); *G02B 5/1852* (2013.01); *G02B 5/1866* (2013.01); *G02B 27/4205* (2013.01); *B42D 25/23* (2014.10); *B42D 25/24* (2014.10); *Y10T 29/49828* (2015.01)

(58) Field of Classification Search
CPC ...... B42D 25/425; B42D 25/23; B42D 25/24; G02B 5/1842; G02B 5/1847; G02B 5/1852; G02B 5/1866; G02B 5/188; G02B 5/18; G02B 27/4205
USPC .......................................... 359/567, 558, 566
See application file for complete search history.

(56) References Cited

U.S. PATENT DOCUMENTS

| | | | |
|---|---|---|---|
| 5,784,200 A | 7/1998 | Modegi | |
| 5,909,313 A | 6/1999 | Lee | |
| 5,991,078 A | 11/1999 | Yoshitake et al. | |
| 6,342,969 B1* | 1/2002 | Lee ...................... | G02B 5/1842 359/2 |
| 7,719,733 B2 | 5/2010 | Schilling et al. | |
| 9,731,538 B2 | 8/2017 | Seils et al. | |
| 2005/0057789 A1* | 3/2005 | Funada ................ | B29C 59/022 359/31 |
| 2006/0097515 A1* | 5/2006 | Raksha ................ | B05D 3/207 283/91 |
| 2006/0145468 A1 | 7/2006 | Plaschka et al. | |
| 2007/0058260 A1 | 3/2007 | Steenblik et al. | |
| 2007/0268536 A1* | 11/2007 | Holmes ................ | G03H 1/0011 359/2 |
| 2007/0284546 A1 | 12/2007 | Ryzi et al. | |
| 2010/0315714 A1* | 12/2010 | Tompkin ................ | B42D 25/20 359/571 |
| 2012/0127547 A1* | 5/2012 | Gocho ................ | B42D 25/324 359/2 |
| 2012/0147470 A1 | 6/2012 | Klenke et al. | |
| 2012/0162271 A1 | 6/2012 | Hsieh | |
| 2013/0029112 A1 | 1/2013 | Bargir et al. | |
| 2015/0331160 A1 | 11/2015 | Rogin et al. | |
| 2015/0352881 A1 | 12/2015 | Seils et al. | |

FOREIGN PATENT DOCUMENTS

| | | |
|---|---|---|
| CN | 104968503 A | 10/2015 |
| DE | 69117369 T2 | 9/1996 |
| DE | 60125942 T2 | 8/2007 |
| DE | 102015110626 A1 | 1/2017 |
| EP | 0105099 A1 | 4/1984 |
| EP | 0375833 A1 | 7/1990 |
| EP | 2239150 A1 | 10/2010 |
| EP | 2447744 A1 | 5/2012 |
| EP | 2600332 A1 | 6/2013 |
| JP | H08-263841 A | 10/1996 |
| JP | H09-502277 A | 3/1997 |
| JP | 2001315472 A | 11/2001 |
| JP | 2011039336 A | 2/2011 |
| JP | 2011510339 A | 3/2011 |
| JP | 2016507761 A | 3/2016 |
| WO | 9103747 A1 | 3/1991 |
| WO | 9318419 A1 | 9/1993 |
| WO | 9402844 A1 | 2/1994 |
| WO | 9428444 A1 | 12/1994 |
| WO | 9502200 A1 | 1/1995 |
| WO | 9823979 A1 | 6/1998 |
| WO | 0203109 A1 | 1/2002 |
| WO | 2005038500 A1 | 4/2005 |
| WO | 2010115936 A1 | 10/2010 |
| WO | 2012059208 A2 | 5/2012 |
| WO | 2014086715 A1 | 6/2014 |
| WO | 2014124781 A1 | 8/2014 |
| WO | 2017001254 A1 | 1/2017 |

OTHER PUBLICATIONS

CN Appln. No. 201480008436.3, Office Action, dated May 17, 2016, 9 pg.
WIPO Appln. PCT/EP2013/075244, International Preliminary Report on Patentability, dated Jun. 9, 2015.
WIPO Appln. PCT/EP2014/051039, International Preliminary Report on Patentability, dated Aug. 18, 2015, 7 pg.
WIPO Appln. PCT/EP2016/064355, International Search Report, dated Aug. 23, 2016, 4 pg.
WIPO Appln. PCT/EP2013/075244, Search Report and Written Opinion, dated Feb. 3, 2014, 8 pg.

* cited by examiner

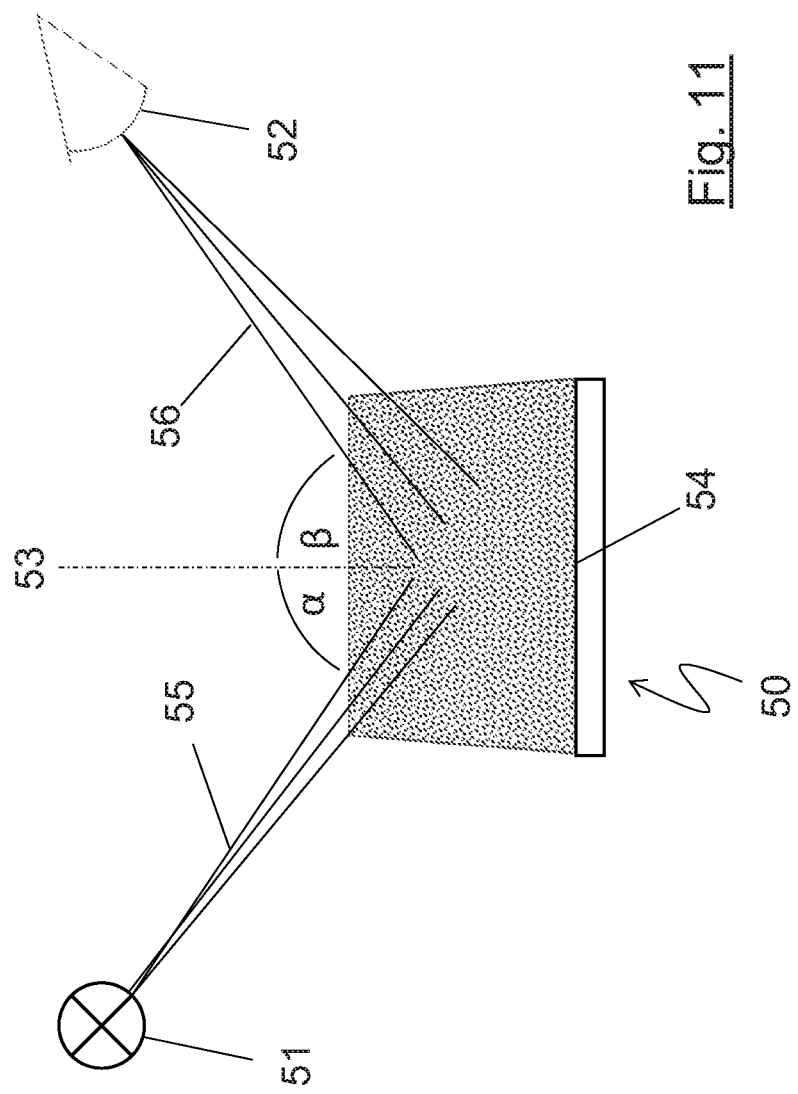

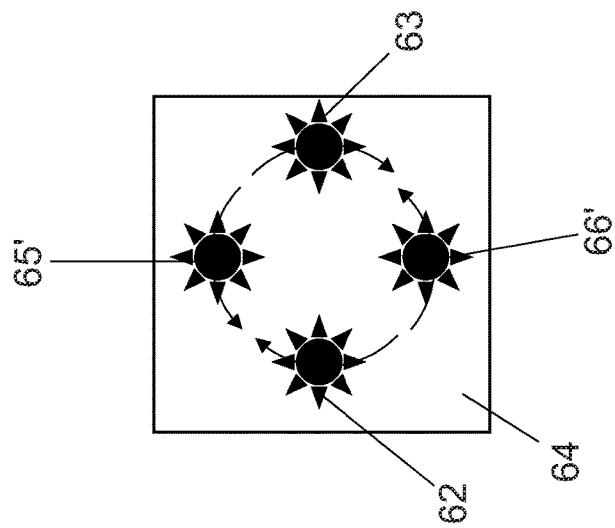
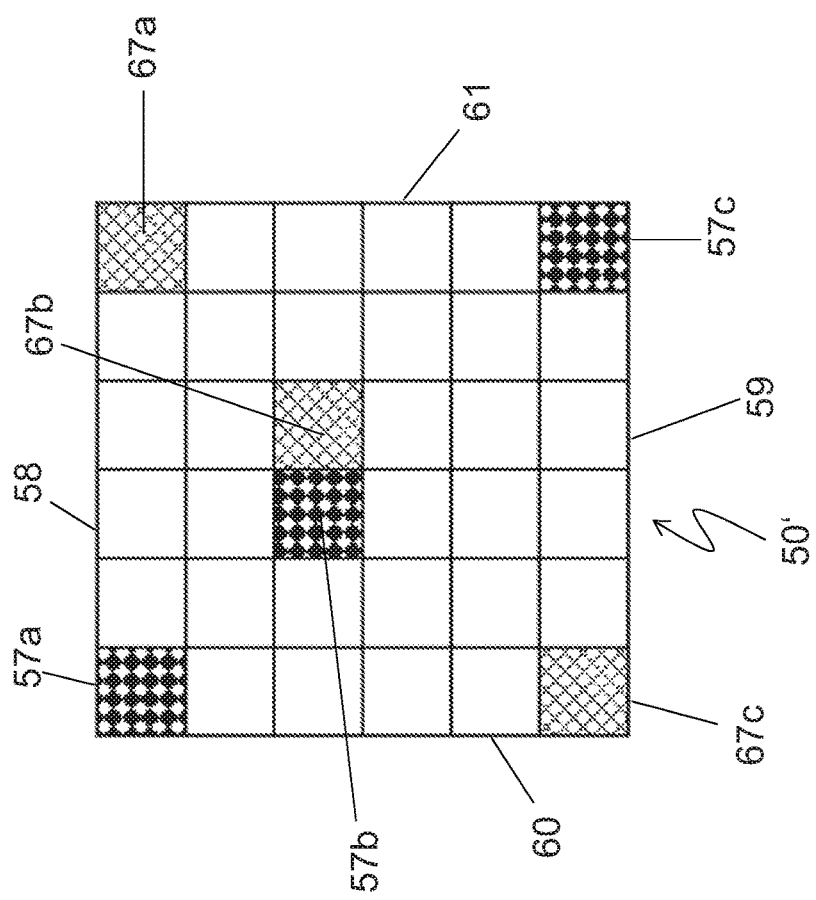

SECURITY DEVICE

CROSS-REFERENCE TO RELATED APPLICATIONS

This application claims the benefit of the following Patent Application: U.S. patent application Ser. No. 14/764,709 filed on Jul. 30, 2015, which claims the benefit of International Patent Application Number PCT/EP2014/051039 filed on Jan. 20, 2014, which claims the benefit of European Patent Application Number EP 13 154 954.5 filed on Feb. 12, 2013; U.S. patent application Ser. No. 14/443,069 filed on May 14, 2015, which claims the benefit of International Patent Application Number PCT/EP2013/075244 filed on Dec. 2, 2013, which claims the benefit of European Application Number EP 12 195 437.4 filed on Dec. 4, 2012; and International Patent Application Number PCT/EP2016/064355 filed on Jun. 22, 2016, which claims the benefit of German Application Number DE 10 2015 110 626.4 filed on Jul. 1, 2015. Patent Applications U.S. Ser. No. 14/794,709, PCT/EP2014/051039, EP 13 154 954.5, U.S. Ser. No. 14/443,069, PCT/EP2013/075244, EP 12 195 437.5, PCT/EP2016/064355 and DE 10 2015 110 626.4 are fully incorporated herein by reference.

BACKGROUND

The present invention relates to a security device.

A large number of security devices are provided in relation to high-security documents, in particular identity documents like passports, identity cards, driving licenses and the like as well as payment means like credit cards, bank notes and the like. This involves, for example, the provision of security devices which are visible to the human eye like holograms. In addition, there are also provided security devices which are not visible to the human eye or which are visible only under special light and which are produced, for example, by dye pigments introduced into the high-security document.

WO 94/28444 A1 and WO 95/02200 A1 describe the production and function of diffractive security features produced by the combination of various conventional diffractive security features like pixelgrams, kinegrams, mathematical holograms and the like. In the case of WO 95/02200 A1 the combination is generated by the superpositioning of the associated grating structures in at least one part of the surface of the combined security feature. WO 94/28444 A1 in contrast relates to a pixelated security feature whose individual pixels are subdivided into subpixels, wherein each individual one of those subpixels is configured in accordance with precisely one of the original security features. The totality of the subpixels is thus subdivided into groups of subpixels, wherein each group represents precisely one of the original security features. In that case the arrangement of the subpixels of a group follows a regular pattern as the association of the subpixels with the respective group remains the same within the higher-level pixels of the combined security feature.

Both WO 94/28444 A1 and also WO 95/02200 A1 thus describe possible ways of superpositioning various diffractive security features in such a way that the viewer can perceive those features on the same surface, wherein the visibility of the individual features is influenced by the combination of illumination and observation angles.

WO 2010/115936 discloses a security device which is particularly suitable for payment means. It has a reflection layer like an aluminum film on the top side of which is arranged a multiplicity of diffractive surface elements. The individual surface elements have a sinusoidal surface structure for producing a diffraction grating. The individual surface elements in that case are of such a configuration that incident light is diffracted in such a way as to give the observer an impression similar to natural asterism. An observer thus sees, for example, a star-shaped symbol which rotates about itself in an image plane.

A security device with another movement effect is described in WO 02/03109. This involves a holographic optically variable image which is produced by a grating structure which is continuously variable as a function of location. The representation of that image follows a predetermined path when the security device is tilted in a first direction. To achieve a sharp image when viewing under white light in that case only a narrow wavelength range is shown in the manner of a rainbow hologram, the wavelength range depending on the rotation of the security device perpendicularly to the first direction. In the case of a tilting movement in that second direction therefore no movement is observed, but instead a change in color.

SUMMARY

In one arrangement, a security device includes a plurality of diffractive surface elements arranged on a carrier element. A surface covered by the diffractive surface elements on the carrier element can occupy at least a partial region of the carrier element. Each individual diffractive surface element can have a three-dimensional surface structure. A portion of the plurality of the diffractive surface elements can form a first surface element group including the portion of the plurality of diffractive surface elements, and an orientation of the diffractive surface elements in the first surface element group can be matched to each other wherein together they make a single first image point of an associated first symbol to be represented visible to an observer under particular observation conditions. A location of the first image point in an observation space can be variable and, after a change in an angle of incidence of a light or an observation angle, the first image point can be formed by diffractive surface elements of a same first surface element group. A plurality of additional surface element groups each can make a respective additional image point of the first symbol to be represented visible. The first symbol can include a sum of all image points represented by the first surface element group and the plurality of additional surface element groups. A movement of the first symbol, which can be continuous for the observer in an observation space, can be perceived by a continuous change in an angle of incidence of the light or the observation angle. A plurality of identical copies of the first symbol can be generated by different diffractive orders of the diffractive surface elements.

In another arrangement, a security device includes a plurality of diffractive surface elements arranged on a carrier element. A surface covered by the diffractive surface elements on the carrier element can occupy at least a partial region of the carrier element. Each individual diffractive surface element can have a three-dimensional surface structure. A portion of the plurality of the diffractive surface elements can form a first surface element group including the portion of the plurality of diffractive surface elements, and an orientation of the diffractive surface elements in the first surface element group can be matched to each other wherein together they make a single first image point of an associated first symbol to be represented visible to an observer under particular observation conditions. A plurality of additional surface element groups each can make a respective additional image point of the first symbol to be represented visible. The first symbol can include a sum of all image points represented by the first surface element group and the plurality of additional surface element groups. A movement of the first symbol, which can be continuous for the observer in an observation space, can perceived by a continuous change in an angle of incidence of light or an observation angle. A plurality of symbols can having a same light intensity can be perceived by the observer. The perceived movement patterns of the plurality of symbols can be opposition. The plurality of the symbols can be perceived to move towards each other as the observation angle becomes smaller. The plurality of identical copies of each of the plurality of symbols can be generated by different diffractive orders of the diffractive surface elements.

In another arrangement, a security device includes a plurality of diffractive surface elements arranged on a carrier element. A surface covered by the diffractive surface elements on the carrier element can occupy at least a partial region of the carrier element. Each individual diffractive surface element can have a three-dimensional surface structure. A portion of the plurality of the diffractive surface elements can form a first surface element group including the portion of the plurality of diffractive surface elements, and an orientation of the diffractive surface elements in the first surface element group can be matched to each other wherein they make a first image point of an associated first symbol to be represented visible to an observer under particular observation conditions. A plurality of additional surface element groups each can make a respective additional image point of the first symbol to be represented visible. The first symbol can include a sum of all image points represented by the first surface element group and the plurality of additional surface element group. A movement of the first symbol, which can be continuous for the observer in an observation space, can be perceived by a continuous change in an angle of incidence of light or an observation angle. The first symbol can be configured to be perceived by the observer to have a distorted curved path responsive to the continuous change in the angle of incidence of the light or the observation angle. A plurality of identical copies of the first symbol can be generated by different diffractive orders of the diffractive surface elements.

A method of producing a security device includes arranging a plurality of diffractive surface elements on a carrier element. A surface covered by the diffractive surface elements on the carrier element can occupy at least a partial region of the carrier element. Each individual diffractive surface element can have a three-dimensional surface structure. A portion of the plurality of the diffractive surface elements can form a first surface element group comprising the portion of the plurality of diffractive surface elements, and an orientation of the diffractive surface elements in the first surface element group can be matched to each other wherein together they make precisely a single first image point of an associated first symbol to be represented visible to an observer under particular observation conditions. A location of the first image point in an observation space can be variable and, after a change in an angle of incidence of a light or an observation angle, the first image point can be formed by diffractive surface elements of a same first surface element group. A plurality of additional surface element groups each can make a respective additional image point of the first symbol to be represented visible. The first symbol can include a sum of all image points represented by the first surface element group and the plurality of additional surface element groups. A movement of the first symbol, which can be continuous for the observer in an observation space, can be perceived by a continuous change in an angle of incidence of light or an observation angle. A plurality of identical copies of the first symbol can be generated by different diffractive orders of the diffractive surface elements.

BRIEF DESCRIPTION OF THE DRAWINGS

FIG. 11 depicts a diagrammatic arrangement of an embodiment of a security device according to the invention between a light source and a viewer.

FIG. 13a depicts a diagrammatic plan view of an alternative embodiment of a security device according to the invention.

FIG. 13b depicts a diagrammatic plan view of the symbols which are generated with the security device of FIG. 13a and which are perceptible for a viewer.

DETAILED DESCRIPTION

Figure 1:
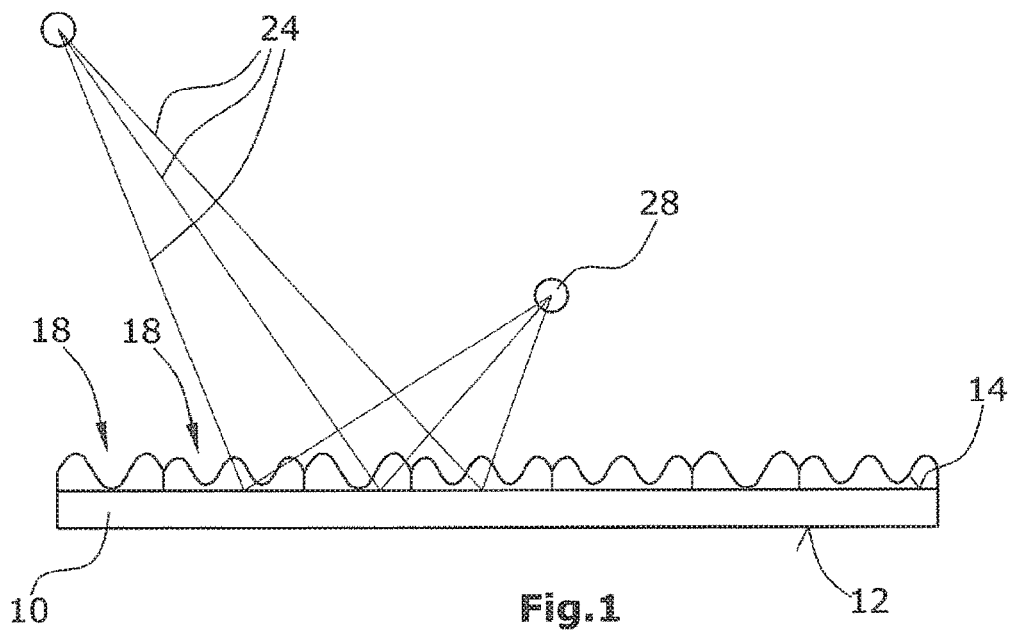
FIG. 1 depicts a diagrammatic side view of a portion of an embodiment of a security device according to the invention.

The present arrangements are directed to a security device for improving the counterfeit protection of articles worthy of protection, for example, original articles, such as products, marks and brand names, admission tickets and documents.

Other examples include high-security documents such as identity documents and means of payment.

An object of the invention is to provide such a security device. That object is attained by a security device for improving counterfeit protection of articles as described herein.

In comparison with that state of the art, there may be a need to provide an optical security device which has a higher degree of design freedom in the selection of the displayed symbols and affords improved copying protection. Furthermore, there may be a need to provide an optical security device permitting presentation of brighter or more brilliant symbols. In addition there may be a need to provide a security device which makes it possible to produce two or more different symbols which, upon a change in the angle of incidence or the observation angle for the viewer, perform a mutually differing, for example opposite, movement in the viewing space. Still there may be a further need to provide a security device for producing an odd number of symbols greater than one.

In accordance with an aspect of the present arrangements, the security device can have a plurality of diffractive surface elements on a carrier element. The surface covered by the surface elements can occupy a partial region of any shape of the carrier element. The individual surface elements can have different base surfaces such as circles, polygons, etc. or combinations. A surface structure can be provided at their top side at which the light is diffracted. The surface structure is, in particular, a diffraction grating with any surface profile, for example, sinusoidal, rectangular or triangular. The basic shape, which can be any shape, of the surface profile can also be in the form of a step profile. Those diffraction gratings can be transparent on a transparent or reflecting carrier element or they can also be reflecting themselves.

The number of surface elements can form a group of surface elements established by the design of the security device. It will be noted, however, that the surface elements of all groups can be distributed on the surface of the carrier. The surface elements of all groups can be distributed in a way that, when the surface elements of a single group are considered, either the number of surface elements involved in the production of the image point of that group, or the selection of the surface elements involved in the production of the image point of that group, depends on an angle of incidence or an observation angle. This even can be the case with the same number of surface elements involved in one or more groups.

In this regard, in accordance with the present arrangements, the term angle of incidence means an angle at which light from a light source, for example the sun or an artificial light source, is incident on the security device. Thus, the angle of incidence is the angle between the above-described grating normal, that is to say the axis of incidence of the carrier and the incident beam, in a viewing of the geometrical optical system. In the case of a plane wave front, the incident beam corresponds to a perpendicular in relation to the wave front.

The term observation angle means the angle at which, measured in relation to the grating normal, a viewer or viewing device (e.g., a camera) views the security device.

As a consequence of their surface structures, the surface elements deflect incident light in given directions. When using diffraction gratings the incident light is, in particular, split up in a plurality of diffraction orders, wherein each diffraction order corresponds to a characteristic change in direction of the diffracted light. The following description now relates firstly to an individual one of those diffraction orders.

In an aspect of the present arrangements, a respective plurality of surface elements can be arranged so as to be distributed over the entire surface form a surface element group. The surface structures of the individual surface elements of a group of surface elements can be matched to each other in such a way that, under any observation conditions, that is to say any combination of light incidence and observation angles, there is always only a selection of given surface elements of that group that diffract the incident light in the direction of the observer. Those selected surface elements can be in close proximity with each other so that the observer perceives a bright image point at the location in question. If the light source and/or the observer changes their position (e.g., viewing angle), then other surface elements of the same group now deflect the incident light to the observer so that the bright image point is visible at another location. According to an aspect of the present arrangements, the diffraction gratings can be matched to each other so that, in a continuous variation in the observation conditions, the observer perceives a continuous movement of the bright image point.

The totality of the surface elements of the security device can include a plurality of such groups of surface elements, which in the described manner, under given illumination and observation conditions, produce bright light image points at various position of the surface of the security device, which surface is covered by the surface elements. In that case, the sum of those bright light image points is perceived by an observer as a symbol that is moved upon a change in the observation conditions, as a whole, over the surface of the security device. The illustrated symbol can be any symbol, such as a geometrical symbol, for example, a circle, a smiley, letters, digits, etc., but also can be a complex logo, or a combination of such symbols. In that case, the path which the movement of the illustrated symbol follows is not predetermined along a one-dimensional curve, but instead arises out of the interplay of illumination and observation angles which can respectively vary in two directions. Correspondingly, that path, in principle, can also cover the entire two-dimensional surface of the security device.

In a simple configuration, the movement of the symbol involves a shift which is proportional to the change in direction of the light, which corresponds to the respective observation conditions. The position of the symbol can correspond to a varying change in direction. In this regard, direct reflection or transmission can appear as a focus about which the symbol appears to circle upon a corresponding movement of the observer and/or the light source.

In other configurations, instead of the above-mentioned isotropic proportionality between the change in direction of the light and the position of the symbol, a different functional dependency may be selected. An example configuration involves applying a proportionality with greatly different proportionality constants in two mutually perpendicular directions of movement so that an observer approximately perceives a linear movement of the symbol. This arrangement is particularly suitable for strip-shaped security elements as can advantageously be provided, for example for use on bank notes.

In other arrangements, non-linear functional dependencies can be used so that, for example, the movement of the symbol appears to follow a distorted path or can even be limited to curved partial regions of the surface of the security element.

In the case of deviations from simple proportionality between the change in direction of the light and the position of the symbol, an observer generally has the impression as though the symbol were viewed through a distorting mirror. That is, because together with the production of a complex path of movement, distortion of the symbol is also afforded at the same time. In certain arrangements, that distortion can be compensated by a suitably distorted configuration of the symbol used as the basic implementation. Another possibility provides defining different movement patterns for the various image points of the illustrated symbol so that in total a non-distorted symbol seems to follow a distorted path.

In a further arrangement, different image points of the symbol can follow different movement patterns. That gives the impression of a continuous variation in the illustrated symbol as a function of the observation conditions without, however, the symbol as a whole following a distorted path.

As mentioned in the opening part of this specification, the foregoing description relates to an individual diffraction order. In general, a plurality of diffraction orders of different intensity can be produced by the grating structures, wherein the intensity relationships are determined by the details of the grating profile used and the materials employed. An advantageous arrangement can place a great emphasis of a single diffraction order over all other diffraction orders. That can be achieved, for example, by suitable asymmetry of the grating profiles.

In another advantageous configuration substantially two mutually symmetrical diffraction orders, in particular the two first diffraction orders, are emphasized over all other diffraction orders. The suppression implemented for the purpose of higher diffraction orders can be achieved, for example, by the grating profile being of a suitable implementation.

If an individual one of the groups of surface elements is viewed under given observation conditions, then for each of the visible diffraction orders, the condition that the light is deflected in the direction of the observer can be fulfilled at another position in the surface of the security device. Accordingly, a plurality of implementations of the illustrated symbols can be represented at different positions. In the case where the visual overall impression is produced substantially by the two first diffraction orders, two implementations of the symbol can become visible. On the assumption that the functional dependency between the change in direction of the light and the position of the symbol is symmetrical with respect to a main focus the two implementations of the symbol, upon a change in the observation conditions, can describe mutually opposite paths in relation to that focus.

Based on that general description of the mode of operation of the security device, various aspects of the present arrangements will be described. Those aspects can be combined together in a suitable fashion without each of those possible combinations being discussed in greater detail.

Through the use of diffraction gratings, a plurality of diffraction orders can occur. The intensity ratio of the diffraction orders can be determined by the detailed configuration of the surface structure. The various diffraction orders can focus the incident light in different image planes so that a plurality of copies of the represented symbol become visible, with respectively different movement patterns. In one arrangement, a strong emphasis on a single copy of the symbol in relation to all others is exhibited. This can be achieved, for example, by implementing a suitable asymmetry of the grating structure.

In one arrangement, at least two identical copies of the first symbol can be emphasized with respect to their intensity. In another arrangement, substantially two equally bright copies of the symbol can be shown, with opposite movement patterns. The symbols can increasingly approach each other in proportion to the reduction in the deflection angle. In that regard, the deflection angle is the deviation between the direction of the observer and the direction along which the light would be propagated in the case of direct transmission or reflection, depending on the respective configuration of the element. That can be achieved, for instance, by the suppression of higher diffraction orders, for example by adaptation of the grating profile. In one aspect, the surface of the security element can be subdivided into a plurality of surface portions in which different symbols are shown. In that case, the focuses of the symbols represented in the various partial regions can be selected that they conform with each other. Thus, the observer has the impression that the symbols merge into each other in the boundary region of the surface portions. That boundary region can be both in the form of a sharp line and also a diffuse transitional region. In a special case of that configuration, adjacent surface portions can have only slightly altered shapes in respect of a single initial symbol. As a result, the observer can have the impression of a stepwise change in the initial symbol during its continuous movement along the curved path.

In an arrangement, each individual three-dimensional surface structure of the security device can have a first periodically repeating structure repeating in a first direction. Further, the three-dimensional surface structure of a plurality of the diffractive surface elements can have a second periodically repeating structure repeating in a second direction, wherein the first direction and the second direction are different. For example, the first periodically repeating structure and the second periodically repeating structure can form an angle more than 1 degree. The first periodically repeating structure and the second periodically repeating structure can be spatially overlapping. A portion of the plurality of the diffractive surface elements having a second periodically repeating structure can form a second surface element group comprising the portion of the plurality of diffractive surface elements, and an orientation of the second periodically repeating structure of the diffractive surface elements in the second surface element group can be matched to each other wherein together they make a single first image point of an associated second symbol to be represented visible to an observer under particular observation conditions. A location of the first image point of the second symbol in an observation space can be variable and, after a change in an angle of incidence of a light or an observation angle, the first image point of the second symbol can be formed by diffractive surface elements of the same second surface element group. A plurality of additional surface element groups each can make a respective additional image point of the second symbol to be represented visible. The second symbol can comprise a sum of all image points represented by the second surface element group and the plurality of additional surface element groups. A movement of the second symbol, which is continuous for the observer in an observation space, can be perceived by a continuous change in an angle of incidence of the light or the observation angle.

In one aspect, the first direction of the first periodically repeating structure and the second direction of the second periodically repeating structure can be different from each other such that an observer will perceive an image point generated by the first periodically repeating structure and an image point generated by the second periodically repeating structure as separated image points. In another aspect, the first periodically repeating structures of the diffractive surface elements in the first surface element group generating a first image point of the first symbol and the second periodically repeating structures of the diffractive surface elements in the second surface element group generating a first image point of the second symbol can be placed and arranged such that an observer or an imaging means cannot perceive the first image point of the first symbol and the first image point of the second symbol as separated image points, but perceive a single image point having an enhanced intensity.

According to the above arrangement, a plurality of surface elements each can have at least one diffractive structure on the surface of the carrier, and can be arranged and distributed on the surface of the carrier so that each of the surface elements have at least one diffractive structure on the surface. The surface elements can form surface element groups, wherein the surface elements of a group produce an image point of a first symbol.

The term diffractive element in accordance with the present arrangements is used to denote any diffracting structure, wherein in an embodiment of the present arrangements the diffractive element is a diffraction grating. In order to act diffractively on electromagnetic radiation, the diffractive element can have a periodically repeating structure, for example a periodic line structure. In one aspect, such a grating can be in the form of a blazed grating. In that way, one diffraction order can be emphasized in relation to the other diffraction orders. Thus, symbols which are not repeated can be produced. For instance, for a particular symbol, there can be a single instance of that symbol.

When in the present specification reference is made to a direction of the periodically repeating structure, that is used to denote the direction in which the structure is repeated. In an aspect of the present arrangements, this can be a direction perpendicular to the lines of a grating.

Expressed in more general terms, the surface of the carrier can have a surface normal, which is perpendicular to a flat face which the carrier covers. That flat face is to be distinguished from the surface which has the individual diffractive elements and which can be in a different direction from the surface normal identified here. That surface normal of the diffractive element is also identified as a grating normal. In this description, the reference to the direction in which the diffractive structure is periodically repeated identifies the azimuthal direction of the first diffraction order which the diffractive element produces. It, therefore, can be said that the first diffractive element has a grating vector with a first azimuthal direction and the second diffractive element has a grating vector with a second azimuthal direction with respect to the grating normal.

A group can, logically and functionally, combine a plurality of surface elements, wherein the surface elements of a group do not have to have a spatial relationship on the surface of the carrier. Rather, the surface elements of an individual group can be functionally connected together by their diffractive elements cooperating and together producing a single image point of a symbol. It will be appreciated that the minimum number of two surface elements is practicable, but a greater number of surface elements can belong to a group and jointly produce an image point.

The overall symbol is then composed of the image points of a plurality of groups of surface elements.

If individual ones of the groups of surface elements are viewed under given viewing conditions, that is to say at predetermined angles of incidence and observation angles then, for each of the visible diffraction orders, the condition that the light is deflected in the direction of the viewer is met at another position with the surface of the security device. Accordingly, depending on the respective configuration of the diffractive elements, a plurality of examples of the symbol can be represented at different positions. In the situation where the overall visual impression is produced substantially by the two first diffraction orders, two examples of the symbol can be become visible.

In principle, each diffractive element can, at the same time, produce diffraction patterns of a differing order. A group of surface elements can produce precisely one image point. It will be appreciated, however, that that image point can also appear in a plurality of examples so that the symbol also appears a plurality of times.

Such symbol, for instance the first symbol or the second symbol in accordance with the present specification, can be of any shape or contour. For example, such a symbol can be a geometrical symbol like for example a circle or a star. A symbol in accordance with the present application, however, can also represent a letter or a digit, any other symbol, or any combination of such symbols.

According to one arrangement, at least one surface element, in addition to the first diffractive element, can have a second diffractive element with a structure which is periodically repeated in a second direction, wherein the first direction and the second direction are different from each other. In other words, that surface element can have two mutually spatially superposed diffractive elements involving a different orientation of their periodic structures. Further, the first and second diffractive elements can have diffraction patterns of the first order, which are arranged at mutually different azimuthal angles.

In that regard, the first and second diffractive elements can be, at least partially, in a mutually superposed spatial relationship. In other words, they both can occupy, at least portion-wise or partially, the same surface of the surface element so that with the same surface usage the number of diffractive elements can be increased. In an aspect of the present arrangements, the first and second diffractive elements can be completely spatially superposed. For instance, they can be coextensive and cover the same area on the surface element so that with the same surface usage the number of diffractive elements can be increased (e.g., doubled).

In the case of a surface element with a plurality of diffractive elements that are mutually deviating with regard to orientation, and which are at least partially spatially superposed, the surface elements can have two or more mutually different diffractive elements that are at least partially spatially superposed. In one arrangement, a surface element can have up to twelve at least partially spatially superposed diffractive elements.

While at least one of the surface elements of the device (e.g., a plurality of surface elements) each can have at least two diffractive elements (e.g., a first diffractive element and a second diffractive element), the present arrangements are not limited in this regard. For example, a portion of the surface elements need not have at least two diffractive elements.

In that respect, the present specification makes a distinction between arrangements in which the first and second diffractive elements jointly produce the image points of only a single first symbol and those arrangements in which the first diffractive elements produce image points of a first symbol while the second diffractive elements produce image points of a second symbol.

Thus, in one arrangement, a plurality of surface elements, in addition to the first diffractive element, can have a second diffractive element with a structure which is periodically repeated in a second direction, wherein the first direction and the second direction are different from each other, wherein the first and the second diffractive elements are at least partially spatially superposed on the surface element, wherein the surface elements having the second diffractive element form a plurality of groups each having at least two surface elements, wherein the surface elements with the second diffractive element are of such an arrangement and configuration that the second diffractive elements of the surface elements of a group produce for a viewer or a viewing device an image point of a second symbol in the viewing space, wherein the second symbol is composed of the image points produced by the plurality of groups of surface elements with the second diffractive element, wherein the surface elements are of such an arrangement and configuration that in an operation of the security device the number of surface elements of a group which produce an image point of the second symbol or the surface elements of the group, that are involved in the production of the second image point, depends on the angle of incidence of the light or on the observation angle, and wherein the surface elements are of such an arrangement and configuration that in the operation of the security device a position of the second symbol in the viewing space for the viewer or the viewing device depends on the angle of incidence or the observation angle.

As also for the production of the first symbol, the surface elements having the second diffractive element in such an arrangement can be combined in a plurality of groups each having at least two surface elements. As previously described, for the first symbol the surface elements with the second diffractive element of a group can produce for a viewer or a viewing device an image point of a second symbol in the viewing space. In one arrangement, the first symbol and the second symbol can be identical and located at an identical location in the observation space.

In one aspect, the same surface element which has two diffractive elements can be associated with a first group, the surface elements of which generate an image point of the first symbol, and at the same time a second group, the surface elements of which generate an image point of the second group. In an arrangement, however, a group of the surface elements of which produce an image point of the first symbol and a group of the surface elements of which produce an image point of the second symbol can contain or include the same surface elements.

The surface elements can be configured so that, in an operation of the security device, the number of surface elements with the second diffractive element of a group, which generate an image point of the second symbol, or the surface elements of the group, which are involved in the production of the second image point (with a constant number), depends on the angle of incidence or the observation angle, and in the operation of the security device a position of the second symbol in the viewing space for the viewer or the viewing device depends on the angle of incidence and the observation angle.

For the second symbol, tilting of the security device, that is to say a change in the angle of incidence or the observation angle, can lead to a change in position of the second symbol, which can be perceived in regard to the viewer or the viewing device as a movement of the second symbol.

Even without the superpositioning of a plurality of diffractive elements on a single surface element with a single security device, aspects of the present arrangements enable two or more different symbols to be produced. It will be appreciated that the device according to the present arrangements achieves the advantage that, on the assumption of an identical size of the surface of the carrier and an identical size in respect of the surface elements, a higher (i.e., enhanced) level of brilliance or intensity of the individual symbols is produced. Moreover, the size of the symbols can be perceived by the observer to increase or decrease in size responsive to a continuous change in the angle of incidence of the light or of the observation angle. In addition, there is a greater degree of freedom in terms of the design of the individual symbols.

In an arrangement, the surface elements can be configured and arranged so that, in an operation of the security device, with a change in the angle of incidence or the observation angle from the viewer or the viewing device, a movement of the first symbol and a movement of the second symbol can be perceived in the viewing space. For instance, the movement of the first and second symbols can be perceived in the viewing space as uniform movements as the angle of incidence or the observation angle from the viewer or the viewing device is changed uniformly.

In one aspect of the present arrangements, the perceptible movements of the first symbol and the second symbol can be on curved, for instance along circular or part-circular paths.

In that regard, in one arrangement, the curved paths of the first and second symbol can have identical center image points of curvature or mutually different center image points of curvature. The center image points of curvature can be within the surface, covered by the surface elements of the carrier of the security device, or in one aspect, they can also be outside of same. In that way, the present arrangements can produce many interesting movement patterns with a high recognition effect.

In an aspect of the present arrangements, the curved paths of the movements of the first symbol and the second symbol can be large radii of curvature in relation to an edge length of the carrier, for example in relation to an edge length of the surface of the carrier, that is covered by the surface elements. Accordingly, the movements of the first symbol and the second symbol can be perceived as linear movements, for instance if the radii of curvature is large enough that the movement may be perceived as linier, even though the movement may fallow an arc unperceivable to a user or device tracking the movement.

In an aspect of the present arrangements, the perceptible movement of the first symbol can be in opposite relationship to the perceptible movement of the second symbol. By way of example, the arrangement of all surface elements with the first diffractive element in a group can be in a mirror symmetrical relationship with an arrangement of the surface elements with the second diffractive element in another group. Alternative arrangements of the surface elements can be implemented that provide a mutually opposite perceptible movement of the first and second symbols.

In an aspect of the present arrangements, the first diffractive element and the second diffractive element can be suitable for the same wavelength range of the light or the electromagnetic radiation. Thus, in an arrangement, the grating constant of the first diffractive element and the grating constant of the second diffractive element can be the same. In a further aspect of the present arrangements, the second grating constant of the second diffractive element is less than the first grating constant of the first diffractive element of the same surface element, wherein the ratio of the first grating constant and the second grating constant is less than 10, less than 5 or less than 3.

In an aspect of the present arrangements, the first grating constant of the first diffractive element and the second grating constant of the second diffractive element of the same surface element can be respectively less than 10 µm. For example, the first grating constant and the second grating constant each can be in a range of 0.2 82 m to 5 µm.

In an aspect of the present arrangements, the first direction of the first diffractive element and the second direction of the second diffractive element of a surface element can differ from each other in such a way that a viewer or a viewing device can recognize the image points produced by those diffractive elements at a predetermined viewing distance as separate image points. In other words, the distinction between the orientations of the two diffractive elements on the surface elements can depend on the spatial resolution capability of the viewer or the viewing device and the spacing from the security device in which the first and second symbols are produced.

In another arrangement, the surface elements of a first group of surface elements which produce an image point of the first symbol in the viewing space and the surface elements of a second group of surface elements which produce an image point of the second symbol in the viewing space can be configured so that at a predetermined viewing spacing, a viewer or a viewing device can no longer recognize the image point of the first symbol and the image point of the second symbol as separate image points, but instead perceives a single image point with an intensity which is increased compared to an image point produced by only one group. In other words, the first symbol and the second symbol in the viewing space can be produced substantially at the same position so that they are perceptible for the viewer as a single symbol and not as separate symbols. It will be appreciated that in such an arrangement the first and second symbols, as viewed in the viewing space, can be substantially identical. In such an arrangement, the diffractive elements of a single surface element may not serve to increase the image points and symbols which are produced per surface area of the security device, and thus which can be perceived separately, but instead can serve to increase the intensity of the produced image points of a single perceptible symbol.

In an aspect of the present arrangements, the first direction of the first diffractive element and the second direction of the second diffractive element can include an angle of more than 1°, for example at least 15°.

A process for producing a security device can include the steps: providing a carrier and producing a plurality of surface elements arranged in distributed relationship and having a first diffractive element, wherein the first diffractive element has a structure which is repeated periodically in a first direction, on a surface of the carrier in such a way that the surface elements with the first diffractive element form a plurality of groups each having at least two surface elements, the surface elements with the first diffractive element of each group are of such an arrangement and configuration that the first diffractive elements for a viewer or a viewing device produce an image point of a first symbol, wherein the first symbol is composed of the image points produced by the plurality of groups, the surface elements are of such an arrangement and configuration that in an operation of the security device the number of surface elements of a group, that produce an image point of the first symbol, or the surface elements involved in the production of the image point of the group depends on an angle of incidence at which light from a light source is incident on the security device or a observation angle $\beta$ at which the viewer or the viewing device views the security device, and the surface elements are of such an arrangement and configuration that in the operation of the security device a position of the first symbol in the viewing space for the viewer or the viewing device depends on the angle of incidence a or the observation angle $\beta$, wherein the process additionally includes the step of producing at least one surface element so that in addition to the first diffractive element it has a second diffractive element with a structure which is repeated periodically in a second direction, wherein the first direction and the second direction are different from each other in such a way that the first and the second diffractive elements on the surface element are at least partially spatially superposed, the surface element with the second diffractive element forms a part of a group with at least two surface elements and the surface element with the second diffractive element is of such an arrangement and configuration that the diffractive elements of the surface elements of the group for a viewer or a viewing device produce an image point of the first symbol or a second symbol in the viewing space.

In that respect In an aspect of the present arrangements, a plurality of surface elements is such that in addition to the first diffractive element the surface elements have a second diffractive element with a structure which is repeated periodically in a second direction, wherein the first direction and the second direction are different from each other, wherein the first and the second diffractive element on the surface element are at least partially spatially superposed, wherein the surface elements with the second diffractive element form a plurality of groups each having at least two surface elements, wherein the surface elements with the second diffractive element are of such a configuration and arrangement that the second diffractive elements of the surface elements of a group for a viewer or a viewing device produce an image point of a second symbol in the viewing space, wherein the second symbol is composed of the image points produced by the plurality of groups of surface elements with the second diffractive element, wherein the surface elements are of such an arrangement and configuration that in an operation of the security device the number of surface elements of a group, that produce an image point of the second symbol, or the surface elements, involved in the production of the second image point, of the group depends on the angle of incidence or on the observation angle, and wherein the surface elements are of such a configuration and arrangement that in the operation of the security device a position of the second symbol in the viewing space for the viewer or the viewing device depends on the angle of incidence or the observation angle.

A further arrangement involves the representation of a plurality of symbols with at least two different focuses. That can be effected either by subdividing the surface into a plurality of surface portions that respectively contain the information for a given symbol and its focus, or also by the diffuse arrangement of the respective surface element groups. In that case, the observer, in particular for the form of arrangement set forth hereinafter, has the impression of symbols which pass through each other in their movement. By virtue of the positioning of the focuses in the boundary region of the surface covered with the surface elements, or just outside the surface covered by the surface elements, the present arrangements can provide one of the two first diffraction orders to be faded out at a maximum over the entire angular range.

A further arrangement is provided when a plurality of adjacent surface elements are selectively brought together to give a combined surface element. Grating constant and orientation of, for example, a particular surface element, which has been brought together with one or more other surface elements, can be associated with the combined surface element. In that way, individual image points of the symbol can be emphasized among special angle combinations, which can give a sparkly impression to the observer in the movement of the symbol. Advantageously, between 0.1% and 50% of the surface elements can be combined together in that form.

In a further arrangement, the security device can be supplemented by an additional light-refracting layer such as, for example, a microprism array, a microlens array or other light-refracting elements. By using suitable light-refracting elements, the observer, for example, can be presented with a replication of the symbols produced which move in respective groups about the focus previously established in the security device or about the fixed focuses.

In a further aspect of the present arrangements, the displayed symbol can be visible within a wide range of observation angles of, for example more than 60° or more than 90°. That requires a wide range of variation in the configuration of the surface structures, and the orientation of the surface structures can assume any desired angle in the carrier element surface. A large variation in the grating constants is also advantageous. In particular, the simultaneous use of very small and large grating constants is recommended for that purpose. Advantageously, the range of the simultaneously used grating constants can be between <500 nm (>2000 lines/mm) and >1500 nm (<666 lines/mm), or between <300 nm (>3333 lines/mm) and >5000 nm (<200 lines/mm). It is advantageous for the size relationship of the largest to the smallest grating constants on the surface structures to be in a relationship of at least 3:1, but a size relationship of at least 10:1 may provide further advantages.

It is further advantageous if the surface elements are of such a nature that the symbol is respectively produced by less than 10%, for example less than 5%, of the surface elements provided on the carrier element.

Advantageously the surface structured on the carrier element is covered with surface elements to at least 10%, at least 30% or at least 50%. Such a filling factor for the surface with surface elements facilitates production of a clearly visible symbol of sufficient brightness so that the symbol can be perceived, in particular, by the human eye without any aid.

The security device according to aspects of the invention can be transparent, reflective, semi-reflective (e.g., semi-translucent). The transparent configuration can be used, in particular, when the security check on the article to be protected is to be effected by viewing there through and the article itself is at least partially translucent.

One or more sides of the security device according to aspects of the invention can be of such a nature that they reflect light incident thereon, For example, the carrier element at an underside and/or at a top side and/or the surface elements can have a light-reflecting layer. For instance, this may respectively involve a layer comprising a metal such as, for example, aluminum, silver, copper, gold or chromium. It will be appreciated that metal alloys and/or combinations of different metals are also suitable. Reflecting thin-film layer elements are also suitable, as are afforded, for example, by dielectric or cholesteric layers. The provision of an aluminum layer may be particularly suitable. Particularly in a configuration having light-reflecting layers at at least two sides, it may be advantageous for at least one of those layers to be semi-translucent. The provision of reflecting layers is dependent, in particular, on the situation of use of the security device. Thus, reflection layers as a component part of the security device are useful, in particular when the security check on the article to be protected is to be effected by viewing thereon and light incident thereon is not reflected or is inadequately reflected by that article itself For production of the surface elements, a lacquer which is configured to be hardened from a liquid state to a hardened state (e.g., chemically cross-linkable) can be applied to a carrier element and the individual surface elements, in particular the surface structure of the surface elements, can be produced by way of a shaping element. Hardening of the lacquer can be effected, for example, by means of UV light and/or by the action of heat. After shaping of the surface elements, the hardened lacquer layer can be advantageously of a thickness of between 0.5 and 300 µm, or between 0.8 and 50 µm or between 1 and 10 µm. The carrier element and/or the surface elements advantageously can have a polymer material or can be made from polymer. In one aspect of the present arrangements, a protective layer can be disposed over the diffractive surface elements, the protective layer having a first refractive index differing from a second refractive index of a material from which the diffractive surface elements are formed by at least 0.03 units.

Production of the surface elements can be effected in such a way that the carrier element comprises a thermoplastic material, and structuring of the individual surface elements can be transferred from a shaping element on to the thermoplastic material. That can be effected, for example, by means of embossing processes, advantageously using pressure and/or heat.

To produce the diffractive elements constituting the security device, information relating to the configuration of three-dimensional surface structures on a plurality of surface elements can be firstly generated, for example by means of data processing programs. That can be achieved, as described hereinbefore with reference to the security device, by forming surface element groups from a plurality of surface elements, wherein the surface structures and the orientation of the surface element groups are so matched to each other that, under given observation conditions, an image point of the symbol is visually represented at a provided position. In addition, various information can be generated. From such information, a plurality of surface element groups can be set up in such a way that they respectively represent an image point so that the symbol to be represented is composed of the sum of all image points shown by the surface element groups. The plurality of diffractive surface elements with three-dimensional surface structures can be arranged on a carrier element, on the basis of the generated information, for production of the security device.

It is particularly advantageous for the security device according to the present arrangements to be provided on or in payment means, such as value-bearing elements (e.g., bank notes, checks, bank cards, credit cards and the like). Other high-security documents, such as pieces of identification (e.g., passports, identity cards, driving licenses, social security cards, etc.), brand-protection devices, and so forth, can also be provided with the security device according to aspects of the invention for simple checking as to whether the situation involves an original article or a counterfeit. Such a security device provides the advantage that it can be viewed by an observer without the assistance of particular reading devices or other aid.

The provision of a security device according to the present arrangements is also advantageous for use on documents such as share certificates, tax labels, deeds, entrance tickets, entry permits and so forth. That applies also for products and brands and marks such as drugs, spirits, tobacco goods, replacement parts, luxury goods and so forth. In illustration, the security device can be a security thread, a tear-open thread, a security strip, a security band, a patch or a label configured to be applied to a carrier material, wherein the carrier material comprises paper, polymer or a paper-like composite material.

The security device according to an embodiment of the invention can be machine-readable. Machine-readability can advantageously also be facilitated by virtue of the security device according to the invention being combined, for example with such security features and/or classes of substance which, in particular, have diffractive, refractive, reflective, polarizing, phase-shifting, electrically conductive, magnetic, colored, fluorescent, phosphorescent and/or other luminescent properties. Combinations of the security device according to the invention with electronic components such as, for example, RFID chips, printed electronics and the like are also advantageous for permitting or improving machine-readability.

Combination with one or more further security features, advantageously with elements produced in or on thermoplastic material like, for example holograms and/or optical lenses, is also within the scope of the present arrangements. A combination can be implemented either—corresponding to the state of the art—by recombination of individual independent security devices or—in accordance with an aspect of this invention—jointly with the production of the security device according to the invention, advantageously for that combination to be produced by means of a common shaping element. In that regard, the arrangement of individual independent security features can be effected, for example in spatial separation relative to each other and/or in the form of diffuse superpositioning of a plurality of security features. The combination of the security device according to the invention with refractive elements such as, for example, lenses, prisms and the like also are within the scope of the present arrangements. Other combinations, of virtually any kind, with further light-influencing layers or materials, as are known, for example in the form of dyestuffs and/or pigments and/or optical filter elements and/or so-called "optical markers", also are within the scope of the present arrangements.

Various aspects of the present arrangements are described hereinafter with reference to the accompanying drawings.

In FIG. 1, an example security device in accordance with the present arrangements has a reflective carrier element 10 which involves, for example, a metal film or a carrier element of, for example, polymer, paper, paper-like composite material, or the like with an applied metal layer, for example, of aluminum vapor-deposited thereon. The reflective carrier element 10 can be arranged, for example, with an underside 12 on a product to be safeguarded such as a credit card, a bank note or the like. If the product to be safeguarded is entirely or partially transparent, the reflective carrier element 10, for example, can be arranged with a top side 14 towards the side of the product. A plurality of diffractive surface elements 18 can be arranged at a surface 14 of the reflective carrier element 10. The individual surface elements 18 are in the form of diffraction gratings. The individual surface elements 18 can be produced, for example, in one process step by a lacquer being applied to the surface 14 of a carrier element 10 and structured by way of a shaping element. In that regard, a lacquer configured to be hardened by UV radiation or the action of heat can be used. In such case, the hardened lacquer layer, after shaping of the surface elements 18, advantageously can be of a thickness of 0.5 μm-300 μm or 0.8 μm-50 μm. In addition, the individual surface elements can be produced, for example, in one process step. For example, the reflective carrier element 10 can include a thermoplastic carrier element in which the surface elements 18 are directly structured by way of a shaping element, for example by means of a hot embossing process. In the last-mentioned case, unlike the situation diagrammatically shown in FIG. 1, there need not be a surface 14 between the reflective carrier element 10 and the surface elements 18.

Incident light beams 24 are reflected at the surface 14 of the reflective carrier element 10, after diffraction has possibly already occurred upon passing into the lacquer layer or the thermoplastic carrier element. Based on interaction with the surface elements 18, the light beams are diffracted into various directions at the outside surface of the individual diffraction gratings. Surface elements 18 which belong to the same surface element group, and which are in close proximity with each other, can diffract the light beams in such a way that they approximately meet at a common image point 28. Viewed over the entire surface of the security device, the position of that image point 28 can steadily vary, even with an unchanged angle of incidence, in such a way that a large multiplicity of movement patterns may be presented. The incident light beams 24, which are shown in the form of lines, are illustrated in simplified form so that only reflection at the surface 14 is shown, and not the diffraction occurring in or at the surface elements 18.

Figure 3:
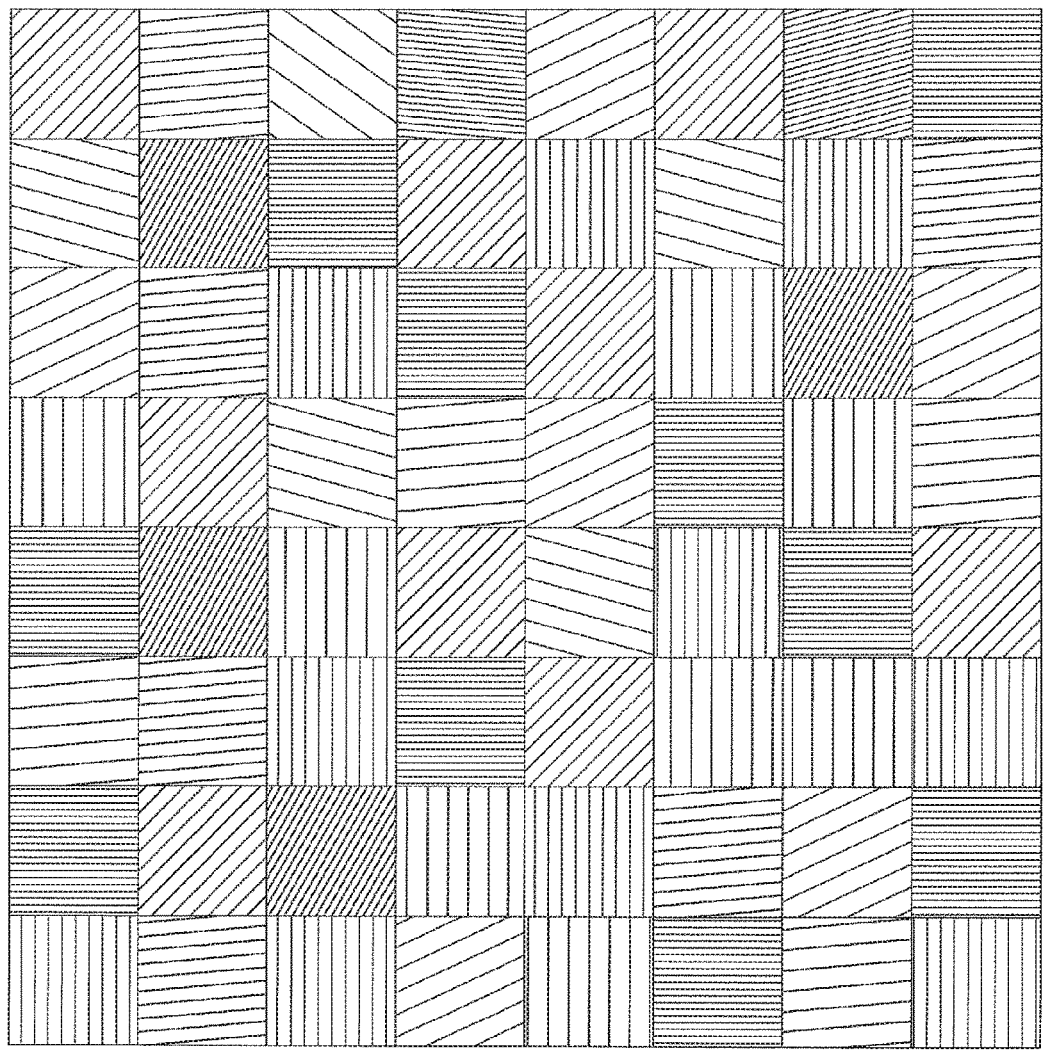
FIG. 3 depicts a diagrammatic plan view showing the principle of the security device according to the invention.
Figure 4:
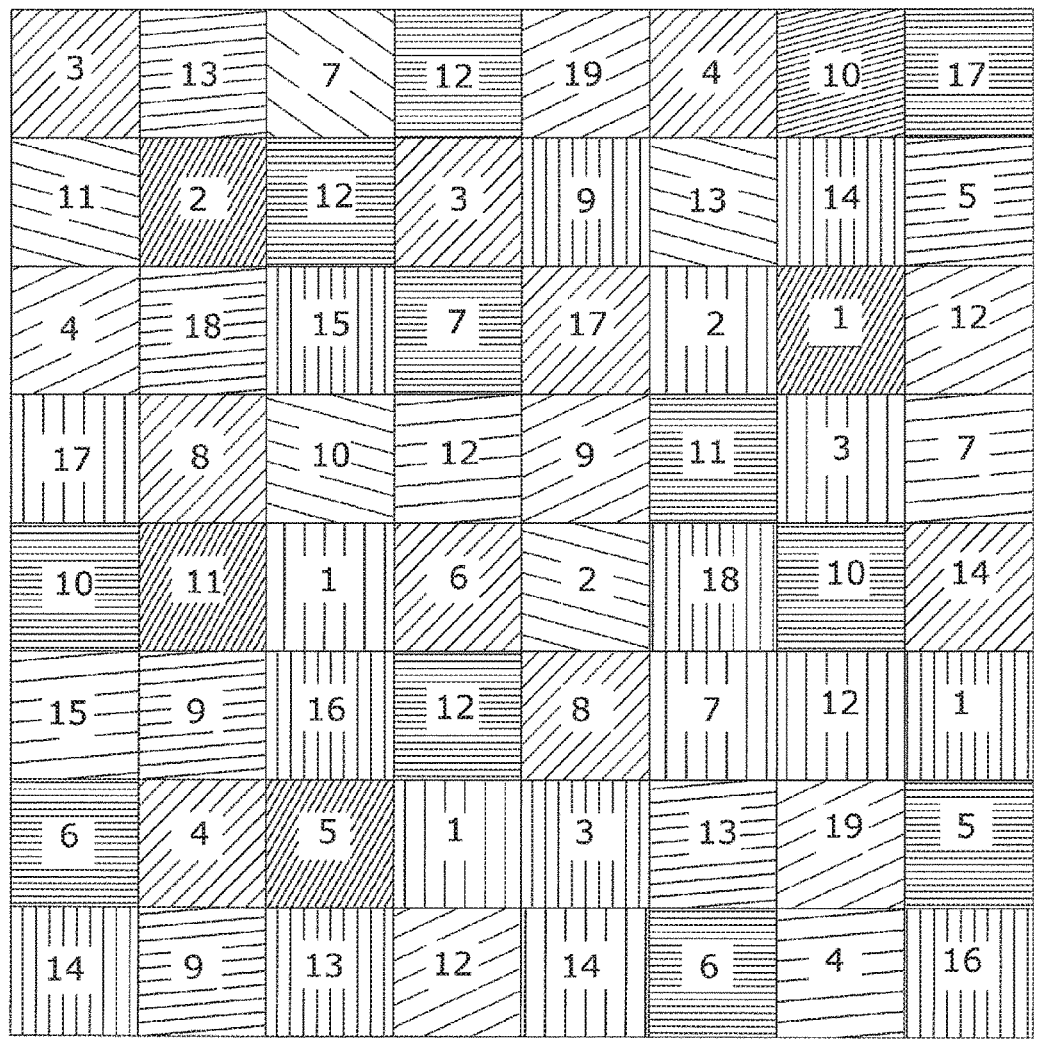
FIG. 4 depicts a diagrammatic plan view showing the principle of a security device according to the invention, wherein surface element groups are denoted by numbers for illustration purposes.

As explained hereinafter, in particular with reference to FIGS. 3 and 4, the representation of an image point 28 is effected by a group of a plurality of individual surface elements 18. The moving image point 28 is always represented by the same surface element group by virtue of the change in the light incidence and/or observation angle. Therefore, the representation of a symbol is effected by the representation of a plurality of image points so that a plurality of surface element groups are arranged on the carrier element 10 corresponding to the number of image points of the symbol that is to be represented.

Figure 2:
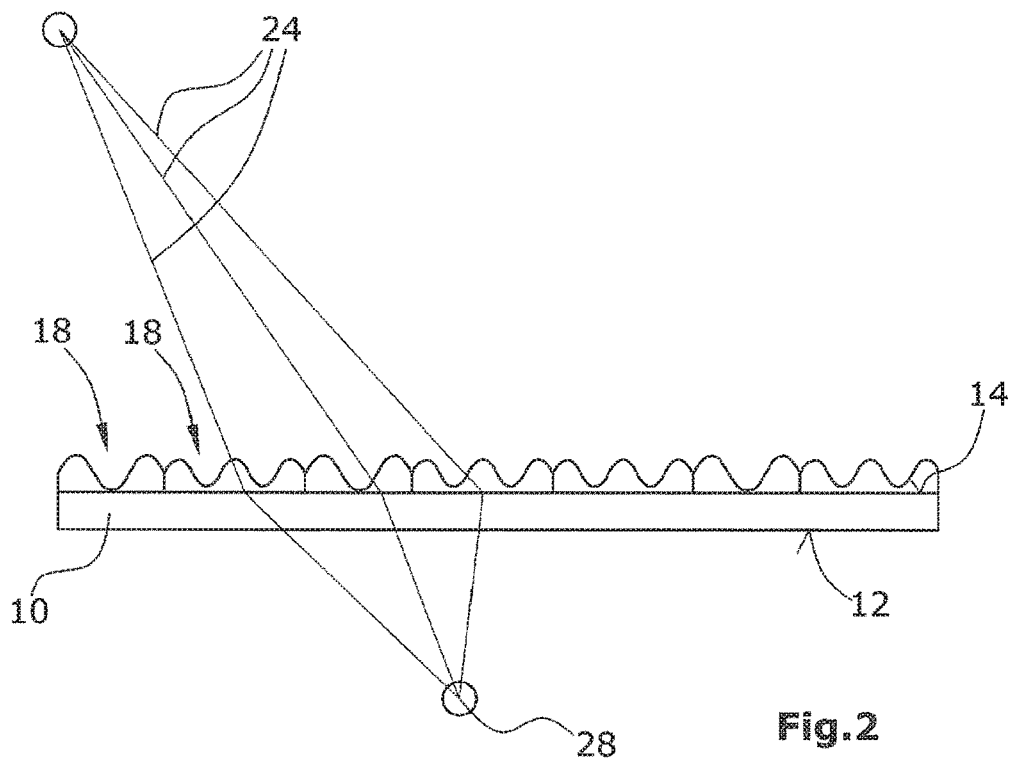
FIG. 2 depicts a diagrammatic side view of a portion of a further embodiment of a security device according to the invention.

Instead of the provision of a reflective security device, it can also be of a transparent nature by means of a transparent carrier element (FIG. 2). The beams 24 thus pass through the surface elements 18 and the carrier element 10 wherein, as described with reference to FIG. 1, an image point 28 is represented in space by the group of surface elements 18.

The individual surface elements 18 have diffraction gratings, these being only diagrammatically illustrated in FIGS. 1 and 2.

In this arrangement, the security device can include a plurality of surface elements 18 on a reflecting or transparent carrier element. The individual surface element groups are made up of a plurality of surface elements 18 irregularly arranged/distributed on the carrier element. The composition of the surface element group is shown as an example in FIGS. 3 and 4. FIG. 3 depicts an example of a diagrammatic plan view of a multiplicity of surface elements which are shown as squares and in which different grating structures are diagrammatically illustrated by lines. The individual surface elements can have grating structures with grating constants in the range of between <500 nm and >1500 nm, or between <300 nm and >5000 nm. In FIG. 3. some surface elements have identical structures. FIG. 4 then depicts an example in which surface elements 18 are combined together to form surface element groups. In FIG. 4 individual groups are identified by numbers 1, 2, 3, . . . for illustration purposes. In this example, a surface element 18 is arranged in each square provided with a number. The individual surface elements 18 of a surface element group have, in particular, surface elements 18 with different surface structures (FIG. 3). The surface structure varies, in particular, in its orientation or alignment. In addition, the surface structure varies in regard to the height or amplitude of the individual gratings and the period thereof.

Figure 5:
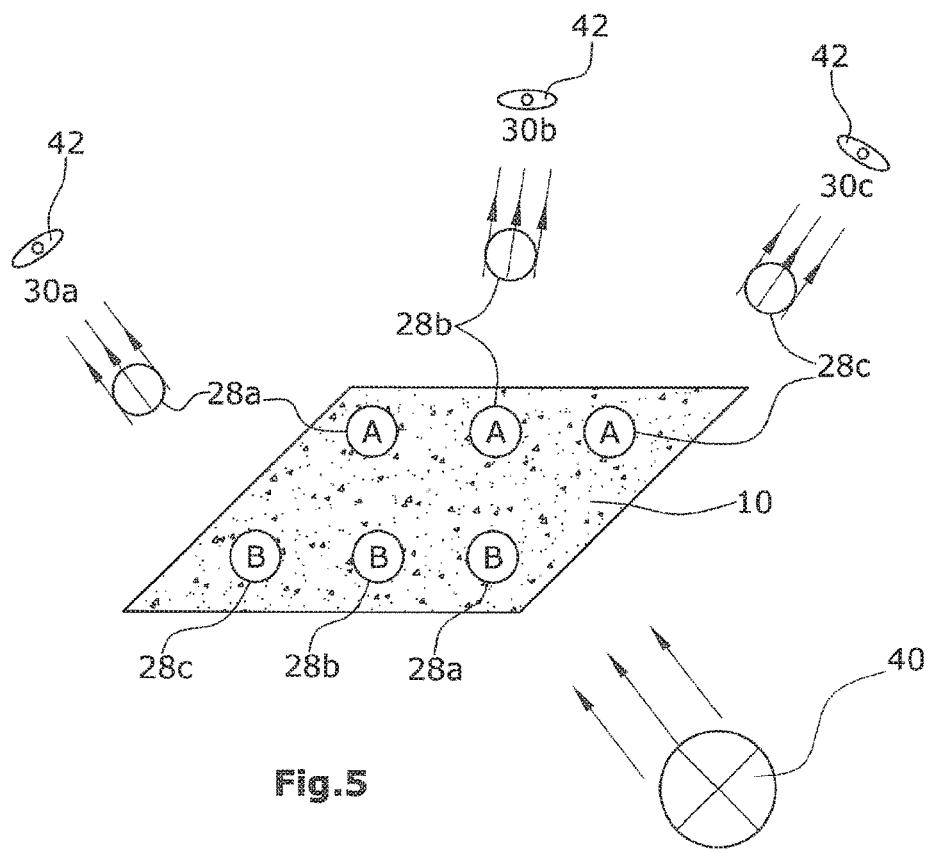
FIG. 5 depicts a diagrammatic perspective view illustrating the principle of a security device according to the invention.

FIG. 5 depicts an example configuration of a security device according to the invention. The carrier element 10 is provided with a multiplicity of individual surface elements 18 (shown in FIGS. 1 and 2) which are image points of differing configurations. Individual ones of the surface elements shown can be respectively combined together to form groups, as can be seen, for example, by reference to FIG. 4. Light can be projected by a light source 40 on to a rear side of the carrier element 10, which is transparent in this arrangement. In this arrangement, to check the security element or to detect a movement of the symbol, an observer 42 can move from a position 30a to a position 30b, and from position 30b to a position 30c. The number and arrangement of the surface elements can be selected so that, in the case of a continuous change in the observation angle, the symbol composed of image points 28 continuously moves and/or may increase or decrease in perceived size. In such situations, the observation angle in the illustrated arrangement changes from the observation angle 30a by way of the observation angle 30b to the observation angle 30c.

A corresponding consideration applies for the situations where the angle of light incidence continuously changes or the light incidence and observation angles continuously change at the same time. A simultaneous change in the light incidence and observation angles can occur, for example, when the security element or the carrier element 10 is moved.

Figure 5A:
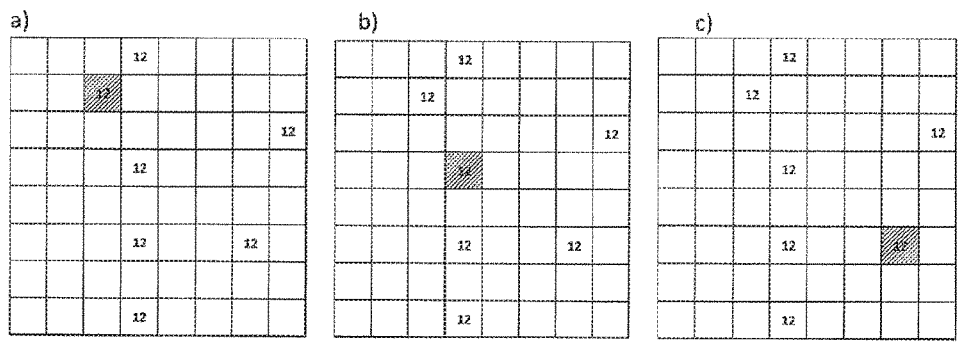
FIG. 5a depicts a diagrammatic view of an individual group of surface elements on a security element.

FIG. 5a depicts an example of a diagrammatic view of an individual group of surface elements on the security element. Based on FIG. 4, the group "12" comprising seven surface elements was selected for this example. In the case that the surface elements are irregularly arranged on the carrier element, the surface elements all can be interchanged in position on the carrier element with other surface elements, such as surface elements belonging to other groups, with adaptation of the respective parameters (grating period and grating vector). For illustration purposes, the surface elements can be in a matrix form, wherein the same respective surface elements are shown in the three matrices illustrated. The three matrices show the action of a change in position of an observer, for example corresponding to the observation positions 30a, 30b and 30c shown in FIG. 5, wherein the surface elements which are visible to the observer at the respective observation angle are shown in hatched form. A sub-set of the entire surface elements of a group can always make a contribution to the illustrated image point. Thus, with a given observation angle, not all surface elements of a given group need contribute to representing an image point. If the position of the observer, and thus the observation angle, changes then the surface elements contributing to the representation can alter. In that case, the illustrated image point, however, still can be represented by surface elements of the same group. Upon a change in the observation angle, the image point can be represented by partially different, or completely different, surface elements of the same surface element group.

Figure 6:
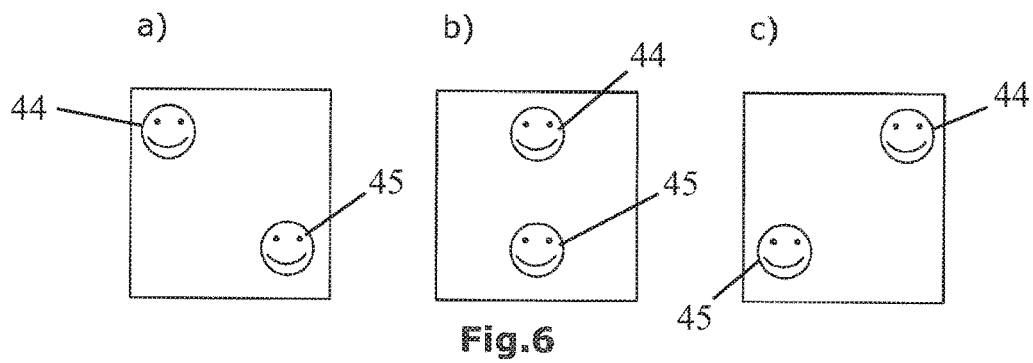
FIG. 6 depicts a diagrammatic view of the symbols perceived by the observer at different angles.

FIG. 6 depicts as a simplified view how a symbol can move from the image point of view of the observer. With an observation angle 30a (FIG. 5), the observer sees two symbols 44, 45, shown in this example as smileys. In this case, for example, the symbol 44 in the top left corner can be produced by the +1st order diffraction, and the symbol 45 in the bottom right corner can be produced by the −1st order. When the observer moves to the position 30b (FIG. 5), the symbol 44 moves from the top left corner towards the right into the center and the symbol 45 moves from the bottom right corner towards the left into the center. In the position 30c, the upper symbol 44 further moves towards the right into the top right corner and the lower symbol 45 further moves towards the left into the left corner. The observer thus sees a continuous movement of the two symbols 44, 45.

Figure 7:
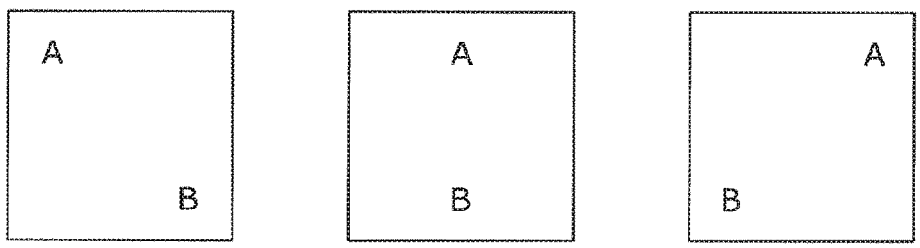
FIG. 7 depicts a diagrammatic view of the security device perceived by the observer with two spatially separated symbols at different angles.

FIG. 7 is a simplified view showing how a symbol can move from the image point of view of the observer. With an observation angle 30a the observer sees two different symbols defined in different partial regions (upper/lower half) of the security device. In this case, for example, a symbol (A) is produced in the top left corner by the +1st order diffraction and the other symbol (B) is produced in the bottom right corner by the −1st order. When the observer moves to the position 30b (FIG. 5) then one symbol (A) moves from the top left corner towards the right into the center and the other symbol (B) moves from the bottom right corner towards the left into the center. In the position 30c the upper symbol (A) moves further towards the right into the top right corner and the lower symbol (B) moves further towards the left into the left corner. The observer thus sees a continuous movement of the two symbols.

Figure 8:
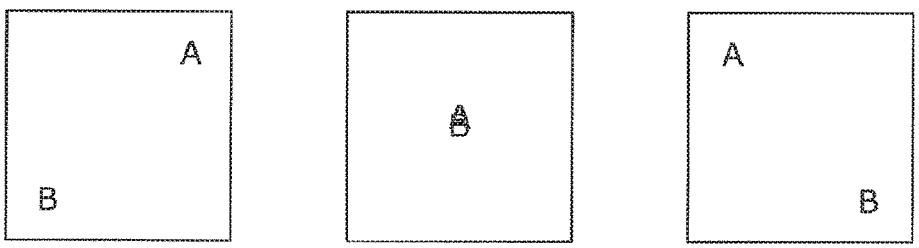
FIG. 8 depicts a diagrammatic view of the security device perceived by the observer with the combination of two symbols which move about different focuses with different angles.

FIG. 8 depicts a simplified view illustrating how a symbol can move from the image point of view of the observer. With an observation angle 30a the observer sees two different symbols which respectively move about different focuses, at the upper edge (A) and at the lower edge (B). In this case, for example, the symbol in the top left corner is produced by the −1st order diffraction and the symbol in the bottom right corner is produced by the +1st order. When the observer moves to the position 30b (FIG. 5) the symbol moves from the top left corner towards the right into the center and the symbol moves from the bottom right corner towards the left into the center. In the position 30c the upper symbol moves further towards the right into the top right corner and the lower symbol moves further towards the left into the left corner. The observer thus sees a continuous movement of the two symbols.

Figure 9:
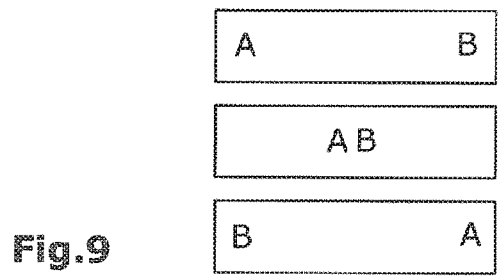
FIG. 9 depicts a diagrammatic view of the security device perceived by the observer with the combination of two symbols whose path of movement approximately follows a straight line, with different angles.

FIG. 9 depicts a simplified view showing how two symbols can move from the image point of view of the observer. With an observation angle 30a the observer sees two different symbols which move along an approximately linear path. In this case, for example, the symbol (A) at the left side is produced by the +1st order diffraction and the symbol (B) at the right side is produced by the −1st order. When the observer moves to the position 30b (FIG. 5) the symbol (A) moves from the left side into the center and the symbol (B) moves from the right side into the center. In the position 30c the symbol (A) moves further towards the right to the right side and the symbol (B) moves further towards the left to the left side. The observer thus sees a continuous movement of the two symbols.

Figure 10:
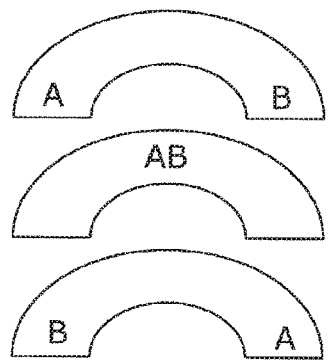
FIG. 10 depicts a diagrammatic view of the security device perceived by the observer with the combination of two symbols whose path of movement follows a curved line with different angles.

FIG. 10 is a simplified view showing how two symbols can move from the image point of view of the observer. In this case, the movement can correspond to a movement similar to that described in FIG. 9, but on a curved path.

FIG. 11 diagrammatically depicts an arrangement in which the security device 50 moves between a light source 51 and the eye 52 of a viewer. FIG. 11 also depicts the grating normal 53, which is perpendicular to a flat surface covered by the carrier 54 of the security device 50. The angle of incidence α is the angle between the radiation 55 incident from the light source 51 on the security device 50 and the grating normal 53 in a plane defined by the grating normal 53 and the incident beam 55. Similarly, the observation angle β is the angle between the grating normal 53 and a beam 56 from the security device 50 to the eye 52 of the viewer.

The function according to the present arrangements of the security device 50 will now be described by reference to the diagrammatic view of such a security device 50 in FIG. 12a. In the illustrated example, the surface of the carrier 54 (FIG. 11) of the security device 50 is completely divided into surface elements 57. In the illustrated example, the surface covered by the surface elements 57 is square, just as the surface elements 57 themselves are also square.

Figure 12B:
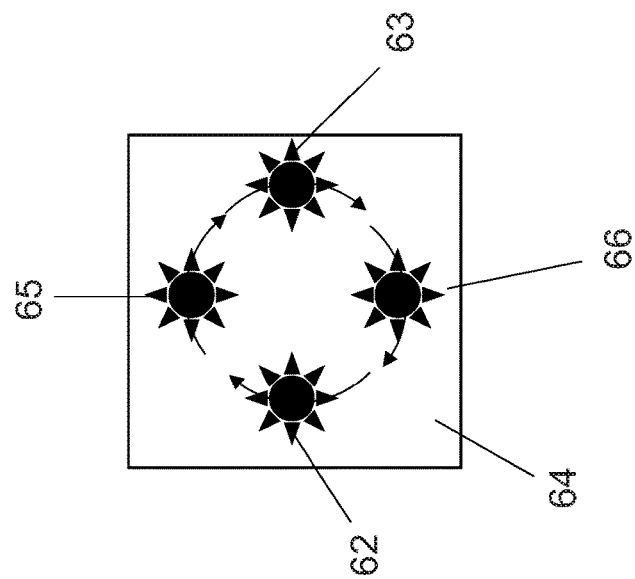
FIG. 12b depicts a diagrammatic plan view of the symbols which are produced with the security device of FIG. 12a and which are perceptible for a viewer.
Figure 12A:
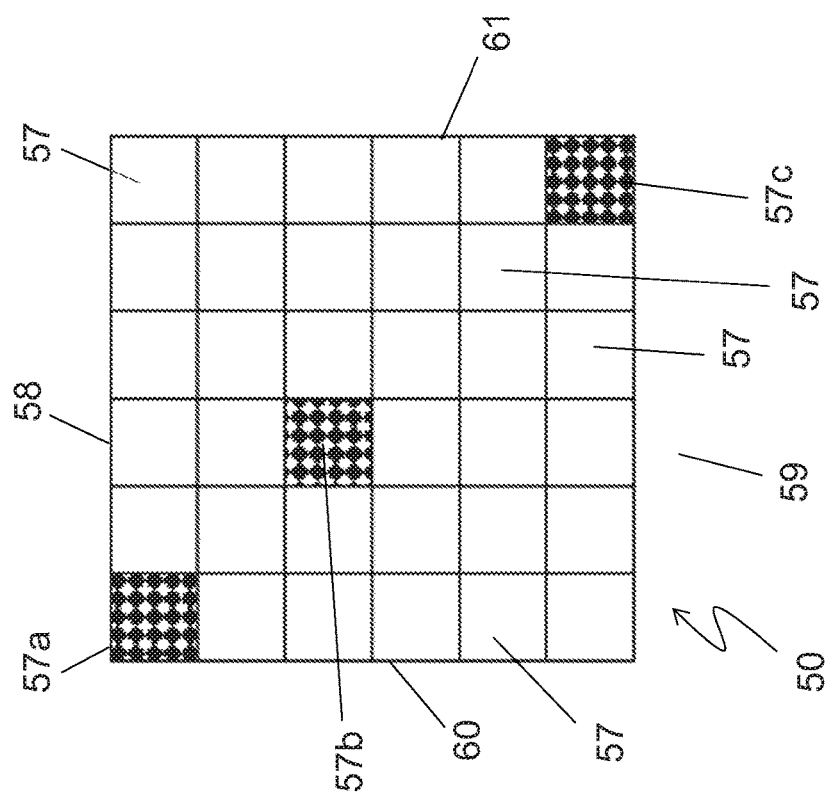
FIG. 12a depicts a diagrammatic plan view of a diagrammatic arrangement of a security device according to the invention.

In the example in FIG. 12a, references 57a, 57b and 57c denote three surface elements which together form a group of surface elements. In the illustrated example, each of the surface elements has two gratings which are turned relative to each other through 90°, with an identical grating constant. Those two gratings are in mutually spatially superposed relationship on the surface elements.

Therefore, the surface elements 57a, 57b, 57c in the diagrammatic view of FIG. 12a present a chessboard pattern. The first gratings of the surface elements 57a, 57b, 57c can be oriented so that their lines extend parallel to the upper and lower edges 58, 59 of the security device 50, and the lines of the second gratings of the surface elements 57a, 57b, 57c extend parallel to the right and left edges 60, 61, respectively, of the security device 50.

In the illustrated example, a group of surface elements with the first grating can be formed by the same surface elements 57a, 57b, 57c as a group of surface elements with the second gratings.

The group of surface elements 57a, 57b, 57c can produce a single image point of a first symbol by means of the first gratings and a single image point of a second symbol by means of the second gratings. The image points which are produced with the first gratings of other groups of surface elements 57 of the security device 50 can form the first symbol together with the image point of the first gratings of the group from the surface elements 57a, 57b, 57c.

It is assumed in the present example that the first symbol comprises a star in a viewing space 64, here a plane, and the second symbol also comprises a star in the same viewing space 64. In this regard, each of the symbols appears in two examples 62, 63 and 65, 66 respectively. The stars 62, 63 of the first symbol are turned through 90° with respect to the stars 65, 66 of the second symbol. This is diagrammatically shown in FIG. 12b.

The surface elements 57 are now arranged distributed over the surface of the security device 50, and the gratings are so adapted, that in dependence on the angle of incidence α and the observation angle β, different surface elements 57a, 57b, 57c of the group are involved in generation of the image point. If three different pairs of angles comprising an angle of incidence α and an observation angle β are considered, then the two surface elements 57a, 57b for the first pair of angles can contribute to producing the image point. For the second pair of angles, the surface elements 57b, 57c can contribute to producing the image point. For the third pair of angles, the surface elements 57a, 57c contribute to producing the image point. Depending on which of the surface elements 57a, 57b, 57c of the illustrated group of surface elements generate the image point of the first symbol, the first symbol can be disposed at another position within the viewing space 64. In the illustrated example, the image point produced by the group having the surface elements 57a, 57b, 57c can, accordingly, occupy three different positions within the viewing space 64.

If the diagrammatic arrangement of FIG. 12a is scaled up to a much larger number of surface elements 57, it will be clear that a small change in the angles a, can cause a small change in the position of each image point, and thus the entire symbol. In that way, continuous tilting of the security device 50 can lead to a continuous movement of the image points, and thus the first and second symbols. In the illustrated example, the first symbol 62, 63 and the second symbol 65, 66 respectively move on a circular path around a center image point at the center of the viewing space or at the center of the security device 50. This can be with the same direction of movement.

FIG. 13a depicts another example of the security device 50'. This example differs from the example of the security device 50 of FIG. 12a in that it is only in relation to their first gratings that the surface elements 57a, 57b, 57c belong to a group which generates an image point of the first symbol 62, 63. The gratings producing the image point of the second symbol 65', 66' which is turned through 90° relative to the first symbol, lie on surface elements 67a, 67b and 67c, which are in mirror symbol relationship with the surface elements 57a, 57b, 57c. Those surface elements 67a, 67b and 67c can form a group in relation to their second gratings.

By virtue of that mirror-image arrangement, the participating surface elements in the production of the image points of the first and second symbols for those two images, upon tilting of the security device 50', can perform an oppositely directed rotational movement.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A security device comprising:
   a plurality of diffractive surface elements arranged on a carrier element;
   wherein a surface covered by the diffractive surface elements on the carrier element occupy at least a partial region of the carrier element;
   wherein each individual diffractive surface element has a three-dimensional surface structure;
   wherein a portion of the plurality of the diffractive surface elements form a first surface element group comprising the portion of the plurality of diffractive surface elements, and an orientation of the diffractive surface elements in the first surface element group are matched to each other wherein together they make a single first image point of an associated first symbol to be represented visible to an observer under particular observation conditions;
   wherein a location of the first image point in an observation space is variable and, after a change in an angle of incidence of a light or an observation angle, the first image point is formed by diffractive surface elements of a same first surface element group;
   wherein a plurality of additional surface element groups each make a respective additional image point of the first symbol to be represented visible;
   wherein the first symbol comprises a sum of all image points represented by the first surface element group and the plurality of additional surface element groups;
   wherein a movement of the first symbol, which is continuous for the observer in an observation space, is perceived by a continuous change in an angle of incidence of the light or the observation angle; and
   wherein a plurality of identical copies of the first symbol is generated by different diffractive orders of the diffractive surface elements.

2. The security device of claim 1, wherein a single copy of the first symbol is emphasized with respect to its intensity.

3. The security device of claim 1, wherein at least two identical copies of the first symbol are emphasized with respect to their intensity.

4. The security device of claim 1, wherein a movement of the first symbol, which is continuous for the observer, is perceived by the continuous change in the angle of incidence of the light or the observation angle and follows a curved path.

5. The security device of claim 1, wherein a movement of the first symbol, which is continuous for the observer, is perceived by the continuous change in the angle of incidence of the light or the observation angle and follows a curved path, wherein a curvature of the curved path is extended so that the observer perceives a linear movement of the first symbol.

6. The security device of claim 1, wherein:
   the first symbol is produced, for the observation angle, by less than 10% of the diffractive surface elements arranged on the carrier element;
   the diffractive surface elements of respective surface element groups are provided in an irregular arrangement on the carrier element; and
   at least 10% of the carrier element is covered with the diffractive surface elements.

7. The security device of claim 1, wherein:
   the diffractive surface elements are applied to the carrier element by applying a radiation-hardening lacquer layer to the surface of the carrier element;
   the diffractive surface elements are structured in the radiation-hardening lacquer layer using a shaping element to shape the diffractive surface elements and hardening the radiation-hardening lacquer; and
   the hardened radiation-hardening lacquer layer, after shaping of the diffractive surface elements, has a thickness of between 0.5 µm and 300 µm.

8. The security device of claim 1, wherein:
   the carrier element comprises a thermoplastic material into which the diffractive surface elements are structured using a shaping element and pressure or heat to shape the diffractive surface elements during an embossing process.

9. The security device of claim 1, further comprising:
   at least one light-reflecting layer, wherein the light-reflecting layer is applied to the diffractive surface elements or an underside of the carrier element, wherein the light-reflecting layer comprises a thin-film layer element or a metal.

10. The security device of claim 1, wherein:
    the first symbol is configured to be perceived by the observer to increase or decrease in size responsive to the continuous change in the angle of incidence of the light or the observation angle.

11. The security device of claim 1, wherein:
    the security device further comprises at least one additional security feature or class of substance which provides at least one other diffractive, refractive, reflective, polarizing, phase-shifting, electrically conductive, magnetic, colored, fluorescent, phosphorescent or luminescent, or provides at least one other electronic component.

12. The security device of claim 11, wherein the at least one additional security feature or class of substance is produced using a common shaping element.

13. The security device of claim 1, wherein the security device is configured to be machine-readable.

14. The security device of claim 1, wherein:
the security device comprises additional diffractive or refractive features; and
the additional diffractive or refractive features for the observer appear either spatially separated from the first symbol or in superposition with the first symbol.

15. The security device of claim 1, further comprising:
a protective layer disposed over the diffractive surface elements, the protective layer having a first refractive index differing from a second refractive index of a material from which the diffractive surface elements are formed by at least 0.03 units.

16. The security device of claim 1, wherein the security device is a security thread, a tear-open thread, a security strip, a security band, a patch or a label configured to be applied to a carrier material, wherein the carrier material comprises paper, polymer or a paper-like composite material.

17. The security device of claim 1, wherein the security device is configured to be a component of a value-bearing element or a security document or a brand-protection device.

18. The security device of claim 1,
wherein each individual three-dimensional surface structure has a first periodically repeating structure repeating in a first direction;
wherein the three-dimensional surface structure of a plurality of the diffractive surface elements has a second periodically repeating structure repeating in a second direction;
wherein the first direction and the second direction are different;
wherein the first periodically repeating structure and the second periodically repeating structure are spatially overlapping;
wherein a portion of the plurality of the diffractive surface elements having a second periodically repeating structure form a second surface element group comprising the portion of the plurality of diffractive surface elements, and an orientation of the second periodically repeating structure of the diffractive surface elements in the second surface element group are matched to each other wherein together they make a single first image point of an associated second symbol to be represented visible to an observer under particular observation conditions;
wherein a location of the first image point of the second symbol in an observation space is variable and, after a change in an angle of incidence of a light or an observation angle, the first image point of the second symbol is formed by diffractive surface elements of a same second surface element group; and
wherein a plurality of additional surface element groups each make a respective additional image point of the second symbol to be represented visible;
wherein the second symbol comprises a sum of all image points represented by the second surface element group and the plurality of additional surface element groups;

wherein a movement of the second symbol, which is continuous for the observer in an observation space, is perceived by a continuous change in an angle of incidence of the light or the observation angle.

19. The security device of claim 18, wherein the first symbol and the second symbol are identical.

20. The security device of claim 18, wherein the first symbol and the second symbol are identical and located at an identical location in the observation space.

21. The security device of claim 18, wherein:
a plurality of different symbols are visible to the observer and are particularly emphasized in a light intensity.

22. The security device of claim 18, wherein the first periodically repeating structure comprises a first grating constant, wherein the second periodically repeating structure comprises a second grating constant, wherein the first grating constant is smaller than the second grating constant and wherein a ratio between the first grating constant and the second grating constant is smaller than 10.

23. The security device of claim 18, wherein the first periodically repeating structure comprises a first grating constant, wherein the second periodically repeating structure comprises a second grating constant, and wherein the first grating constant and the second grating constant are equal.

24. The security device of claim 18, wherein the first periodically repeating structure comprises a first grating constant, wherein the second periodically repeating structure comprises a second grating constant, and wherein the first grating constant and the second grating constant are smaller than 10 µm.

25. The security device of claim 18, wherein the first direction of the first periodically repeating structure and the second direction of the second periodically repeating structure are different from each other such that an observer will perceive an image point generated by the first periodically repeating structure and an image point generated by the second periodically repeating structure as separated image points.

26. The security device of claim 18, wherein the first periodically repeating structures of the diffractive surface elements in the first surface element group generating a first image point of the first symbol and the second periodically repeating structures of the diffractive surface elements in the second surface element group generating a first image point of the second symbol are placed and arranged such that an observer or an imaging device cannot perceive the first image point of the first symbol and the first image point of the second symbol as separated image points, but perceive a single image point having an enhanced intensity.

27. The security device of claim 18, wherein the first direction of the first periodically repeating structure and the second direction of the second periodically repeating structure form an angle of more than 1 degree.

28. The security device of claim 18, wherein the security device is implemented on a document, a piece of identification, a certificate, a means of payment, a bank note, a check, a bank card, a credit card, a good or a packaging.

29. A security device comprising:
a plurality of diffractive surface elements arranged on a carrier element;
wherein a surface covered by the diffractive surface elements on the carrier element occupy at least a partial region of the carrier element;
wherein each individual diffractive surface element has a three-dimensional surface structure;
wherein a portion of the plurality of the diffractive surface elements form a first surface element group comprising the portion of the plurality of diffractive surface elements, and an orientation of the diffractive surface elements in the first surface element group are matched to each other wherein they make a first image point of an associated first symbol to be represented visible to an observer under particular observation conditions;

wherein a plurality of additional surface element groups each make a respective additional image point of the first symbol to be represented visible;

wherein the first symbol comprises a sum of all image points represented by the first surface element group and the plurality of additional surface element groups;

wherein a movement of the first symbol, which is continuous for the observer in an observation space, is perceived by a continuous change in an angle of incidence of light or an observation angle;

wherein a plurality of symbols having a same light intensity are perceived by the observer;

wherein perceived movement patterns of the plurality of symbols can be in opposition;

wherein the plurality of the symbols are perceived to move towards each other as the observation angle becomes smaller; and wherein a plurality of identical copies of each of the plurality of symbols is generated by different diffractive orders of the diffractive surface elements.

30. The security device of claim 29, wherein a single copy of each symbol is emphasized with respect to its intensity.

31. The security device of claim 29, wherein at least two identical copies of each of the plurality of symbols are emphasized with respect to their intensity.

32. A security device comprising:
a plurality of diffractive surface elements arranged on a carrier element;
wherein a surface covered by the diffractive surface elements on the carrier element occupy at least a partial region of the carrier element;
wherein each individual diffractive surface element has a three-dimensional surface structure;
wherein a portion of the plurality of the diffractive surface elements form a first surface element group comprising the portion of the plurality of diffractive surface elements, and an orientation of the diffractive surface elements in the first surface element group are matched to each other wherein they make a first image point of an associated first symbol to be represented visible to an observer under particular observation conditions;
wherein a plurality of additional surface element groups each make a respective additional image point of the first symbol to be represented visible;
wherein the first symbol comprises a sum of all image points represented by the first surface element group and the plurality of additional surface element groups;
wherein a movement of the first symbol, which is continuous for the observer in an observation space, is perceived by a continuous change in an angle of incidence of light or an observation angle;
wherein the first symbol is configured to be perceived by the observer to have a distorted curved path responsive to the continuous change in the angle of incidence of the light or the observation angle; and
wherein a plurality of identical copies of the first symbol is generated by different diffractive orders of the diffractive surface elements.

33. The security device of claim 32, wherein a single copy of each symbol is emphasized with respect to its intensity.

34. The security device of claim 32, wherein at least two identical copies of each of a plurality of symbols are emphasized with respect to their intensity.

35. A method of producing a security device, comprising:
arranging a plurality of diffractive surface elements on a carrier element;
wherein a surface covered by the diffractive surface elements on the carrier element occupy at least a partial region of the carrier element;
wherein each individual diffractive surface element has a three-dimensional surface structure;
wherein a portion of the plurality of the diffractive surface elements form a first surface element group comprising the portion of the plurality of diffractive surface elements, and an orientation of the diffractive surface elements in the first surface element group are matched to each other wherein together they make precisely a single first image point of an associated first symbol to be represented visible to an observer under particular observation conditions;
wherein a location of the first image point in an observation space is variable and, after a change in an angle of incidence of a light or an observation angle, the first image point is formed by diffractive surface elements of a same first surface element group;
wherein a plurality of additional surface element groups each make a respective additional image point of the first symbol to be represented visible;
wherein the first symbol comprises a sum of all image points represented by the first surface element group and the plurality of additional surface element groups;
wherein a movement of the first symbol, which is continuous for the observer in an observation space, is perceived by a continuous change in an angle of incidence of light or an observation angle; and
wherein a plurality of identical copies of the first symbol is generated by different diffractive orders of the diffractive surface elements.

36. The method of claim 35, wherein a single copy of each symbol is emphasized with respect to its intensity.

37. The method of claim 35, wherein at least two identical copies of each of a plurality of symbols are emphasized with respect to their intensity.

38. The method of claim 35, further comprising:
attaching the carrier element to a value bearing device or a security document or a brand-protection device.

39. The method of claim 35, wherein:
each individual three-dimensional surface structure has a first periodically repeating structure repeating in a first direction;
the three-dimensional surface structure of a plurality of the diffractive surface elements has a second periodically repeating structure repeating in a second direction;
the first direction and the second direction are different;
the first periodically repeating structure and the second periodically repeating structure are spatially overlapping;
a portion of the plurality of the diffractive surface elements having a second periodically repeating structure form a second surface element group comprising the portion of the plurality of diffractive surface elements, and an orientation of the second periodically repeating structure of the diffractive surface elements in the second surface element group are matched to each other wherein together they make a single first image point of an associated second symbol to be represented visible to an observer under particular observation conditions;

a location of the first image point of the second symbol in an observation space is variable and, after a change in an angle of incidence of a light or an observation angle, the first image point of the second symbol is formed by diffractive surface elements of a same second surface element group;

a plurality of additional surface element groups each make a respective additional image point of the second symbol to be represented visible;

the second symbol comprises a sum of all image points represented by the second surface element group and the plurality of additional surface element groups; and a movement of the second symbol, which is continuous for the observer in an observation space, is perceived by a continuous change in an angle of incidence of the light or the observation angle.

* * * * *

UNITED STATES PATENT AND TRADEMARK OFFICE
CERTIFICATE OF CORRECTION

PATENT NO. : 10,207,531 B2
APPLICATION NO. : 15/676625
DATED : February 19, 2019
INVENTOR(S) : Frank Seils, Markus Koch and Peter Rogin Page 1 of 1

It is certified that error appears in the above-identified patent and that said Letters Patent is hereby corrected as shown below:

On the Title Page

Item (73) Assignee "SECTAG GmbH" should be corrected to --SECTAGO GmgH--.

Signed and Sealed this
Third Day of September, 2019

Andrei Iancu
*Director of the United States Patent and Trademark Office*